United States Patent [19]

Genschorek

[11] Patent Number: 5,740,996
[45] Date of Patent: Apr. 21, 1998

[54] DEVICE FOR MOUNTING PLATE-LIKE CONSTRUCTION COMPONENTS

[76] Inventor: Gido Genschorek, Eschenweg 2, D-15827 Dahlewitz, Germany

[21] Appl. No.: 695,313

[22] Filed: Aug. 9, 1996

[30] Foreign Application Priority Data

Aug. 9, 1995 [DE] Germany ............... 195 29 351.7

[51] Int. Cl.[6] .................................................. E04D 13/18
[52] U.S. Cl. ........................ 248/237; 52/173.3; 136/244
[58] Field of Search ........................... 248/237, 222.11, 248/222.12; 136/244; 52/173.3

[56] References Cited

U.S. PATENT DOCUMENTS

| | | | |
|---|---|---|---|
| 3,290,131 | 12/1966 | Neal, Jr. .................. | 248/222.11 X |
| 4,336,413 | 6/1982 | Tourneux .................. | 52/173.3 X |
| 5,104,072 | 4/1992 | Kuo et al. ................. | 248/222.12 X |
| 5,164,020 | 11/1992 | Wagner et al. ............. | 136/244 |
| 5,232,518 | 8/1993 | Nath et al. ................ | 136/244 X |
| 5,290,000 | 3/1994 | Hochstein et al. .......... | 248/222.11 X |
| 5,505,788 | 4/1996 | Dinwoodie ................. | 136/244 X |
| 5,571,338 | 11/1996 | Kadonome et al. .......... | 52/173.3 X |
| 5,651,837 | 7/1997 | Ohtsuka et al. ............ | 136/244 X |

FOREIGN PATENT DOCUMENTS

| | | |
|---|---|---|
| 456.291 | 5/1854 | Belgium . |
| 906.028 | 4/1987 | Belgium . |
| 36 34 729 | 5/1987 | Germany . |
| 92 09 228.4 | 12/1992 | Germany . |
| 93 10 063.9 | 10/1993 | Germany . |
| 94 09 453.5 | 9/1994 | Germany . |
| 94 15 616.6 | 3/1995 | Germany . |

Primary Examiner—Derek J. Berger
Attorney, Agent, or Firm—Collard & Roe, P.C.

[57] ABSTRACT

A device for mounting plate-like construction components, in particular solar modules and solar energy collectors on inclined surfaces. The plate-like construction components are arranged in the longitudinal direction on such surfaces, and disposed one on top of the other in the form of scales. The plate-like construction components are mounted on profiles which extend in the longitudinal direction on a substantially horizontally disposed mounting support framework such as roof battens. Each profile has at its top side two lateral support surfaces extending in its longitudinal direction, and a groove disposed between said support surfaces. The construction components rest with each of their lateral edges on one of the support surfaces of the profile, with a gap between the two lateral edges and above the groove. The profile is an inverted U-shape with each leg of the profile consisting of an inner and an outer vertical leg. The outer vertical leg limits the profile laterally. A horizontal step is formed in each of the legs at the same level, and divides the legs into a top section and a bottom section. The bottom section of a second profile is insertable in the top section of a first profile, and both sections rest positively against each other.

9 Claims, 2 Drawing Sheets

5,740,996

DEVICE FOR MOUNTING PLATE-LIKE CONSTRUCTION COMPONENTS

BACKGROUND OF THE INVENTION

1. Field of the Invention

The present invention relates to a mounting device for construction components. More particularly, it relates to a mounting device for solar modules and solar energy collectors on sloped surfaces.

2. The Prior Art

A similar mounting device as that of the present invention is known from G 94 09 453 U1. The device mounts frameless solar modules on sloped surfaces, such as, for example, steep roofs. The profiles are made of wood and are mounted on the horizontally disposed wooden roof battens. These profiles are especially suitable for the roofs of smaller houses, such as one-family homes.

In order to prevent water damage, the wooden profile is provided with a sealing on the top side. This sealing requires additional expenditure in manufacturing. In order to form a deepening underneath the adjacent edges of two panels for purposes of drainage, the wood profile is designed from three pieces of wood joined together.

The wooden profile design is ecologically useful in many ways. However, wooden profiles are less suitable for mounting larger solar installations, and for enabling the mounting of plate-like construction parts on vertical surfaces, such as, suspended facades. The wooden profile is not capable of withstanding the resistance and torsion applied by the plate-like construction components. Thus, in order to increase the strength, additional material must be used, thereby increasing the weight and amount of timber used this results in an ecological drawback.

SUMMARY OF THE INVENTION

According to the invention, the drawbacks of the prior art are overcome by providing an inverted U-shaped mounting profile part having two leg members coupled by a bridge member. Each leg member of the inverted U-shaped profile has an inner and outer vertical leg connected at the bottom thereof by a horizontal leg. The outer vertical legs laterally limits the profile. Within the outer vertical legs and the associated inner legs a horizontal step is formed at the same level. The horizontal step divides the legs into a top section and a bottom section. The bottom section of a second profile can be inserted into the top section of a first profile in a positively abutting frictional engagement to accommodate various size applications. The top and bottom sections have approximately the same inside height.

A sliding piece is arranged at the top of the inside surface of the vertical outer legs and at the bottom of the outside surface. The height of the sliding pieces corresponds to approximately half of the inside height of the top and bottom sections. The horizontal surfaces of the sliding pieces abut each other when a first and second profile are pushed together.

On the inner side of each leg of the inverted U-shaped profile, the inside width of the top section is larger than the inside width of the bottom section by approximately the material thickness of the profile. On the outer side of the U-shaped profile, the width of the top section is larger than the width of the bottom section by approximately the material thickness of the profile and the width of the sliding piece.

In a preferred embodiment of the invention, the central horizontal bridge of the inverted U-shaped profile has two lateral support surfaces for the plate-like construction components, and a deepening, gap or conduit disposed between the support surfaces. A seal can be disposed between the lateral support surfaces and the plate-like construction part.

In order to fasten the plate-like construction components to the profiles, the profiles are provided with bores for horizontally receiving a retaining bolt. The bores, and thereby the retaining bolt, are disposed in the top sections of the profile in a predetermined location along the vertical inner and outer legs. A plurality of hooks for holding the plate-like construction part are swivel-mounted on the retaining bolt. The hooks can be arranged on the retaining bolt laterally on the outside of the inverted U-shaped profile, or within the top sections of the profile.

The bottom horizontal legs of the leg members have openings for receiving fastening elements for mounting the profile on the inclined surface framework. In the preferred embodiment, the openings are arranged in the upper most end of the profile with respect to the inclined surface and in the area covered by the bottom section of a second profile.

It is therefore an object of the present invention to provide a profile for mounting plate-like construction parts on inclined surfaces that assures a safe and positive connection of the profiles.

It is another object of the invention to provide a profile for mounting plate-like construction parts on inclined surfaces that utilizes interlocking sliding pieces to prevent the profiles from reciprocally folding up.

A further object of the invention is to provide a profile for mounting plate-like construction parts that operates efficiently and reliably.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
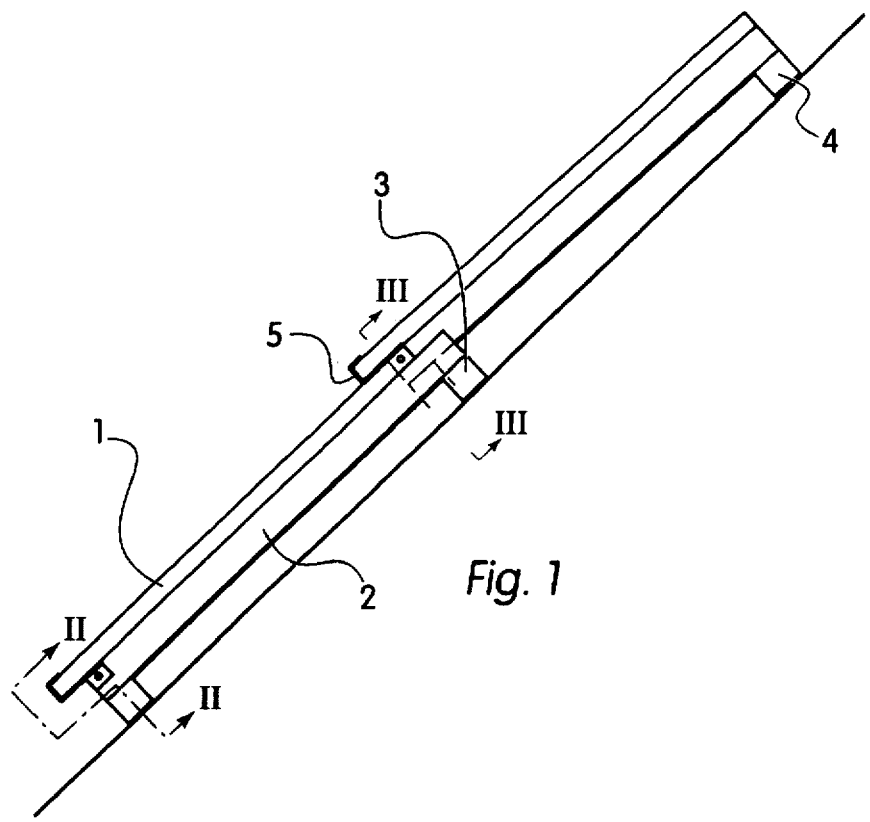
FIG. 1 is a plan view of the mounting device with suspended plate-like construction components according to the invention.

Turning now in detail to the drawings, FIG. 1 shows plate-like construction components 1 disposed in the longitudinal direction on an inclined surface, such as, for example a steep roof. The components 1 can be solar modules, solar energy collectors, or any other plate-like component to be mounted on an inclined surface. The components 1 are arranged to form scales whereby the top end of the upper panel extends toward the ridge of the roof, and the bottom end of the upper panel overlaps the top end of the lower panel. The components or solar modules 1 are supported by profiles 2 which also extend longitudinally along the roof.

Figure 2:
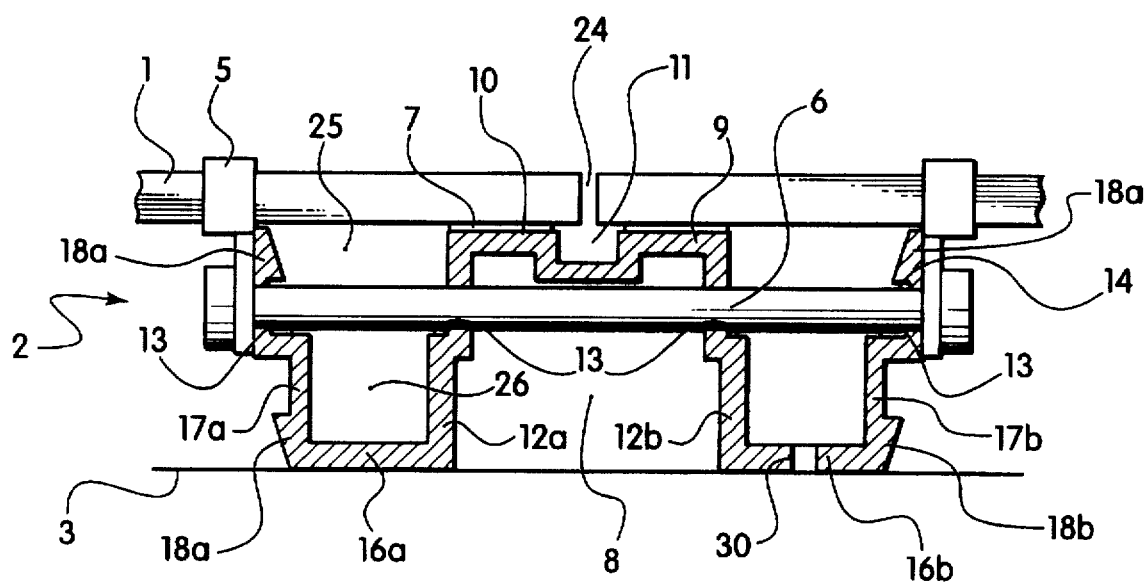
FIG. 2 is a partial cross-sectional of the mounting device taken along line II—II of FIG. 1.

The profiles are mounted on the horizontally extending framework part 3. Framework part 3 is a mounting support in the form of roof battens. FIG. 2 shows a hook 5 disposed on the front end of profile 2 with construction component 1 inserted in said hook.

Profile 2 can mount solar modules with or without fitted frames, in addition to other plate-like construction components 1 such as, for example, solar energy collectors or facing elements. Profile 2 can also be used for mounting plate-like construction components 1 on vertical walls.

FIG. 2 shows a cross section of the profile according to FIG. 1. Profile 2 is made of metal and preferably aluminum or an aluminum alloy. Profile 2 has an inverted U-shape having an open inverted U-profile part 8, and two leg portions. Each leg portion is defined by an inner vertical leg 12a and 12b integrally formed with one end of a bottom horizontal leg 16a and 16b, respectively, and an outer vertical leg 17a and 17b, integrally formed with other end of the horizontal leg 16a and 16b, respectively. Outer legs 17a and 17b, and inner legs 12a and 12b are disposed at right angles with respect to horizontal legs 16a and 16b. Thus, each leg portion member portion forms and open top U-shape chamber. The outer vertical legs 17a and 17b laterally limit profile 2.

The horizontal bridge 9 of inverted U-profile part 8 is provided with two lateral support surfaces 10, and a deepening or groove 11 disposed between said support surfaces. Both inner legs 12a and 12b, and outer legs 17a and 17b have a horizontal step 13 disposed at the same level. Step 13 divides the chambers defined by legs 12 and 17 into a top section 25 and a bottom section 26, each having approximately equal clear inside heights.

Each outer vertical leg 17a and 17b have a first sliding piece of the same width 18a disposed on top end of the inner surface of each of said legs, and a second sliding piece 18b is disposed on the bottom end of the outer surface of each of said legs. The height of sliding pieces 18a and 18b approximately corresponds with half of the inside height of top and bottom sections 25 and 26. Sliding pieces 18 have a sloped surface for facilitating the insertion of one profile into another, and a horizontal surface for egaging an opposing sliding piece and securing the connection between the two profiles.

The inside width of top section 25 on the sides of legs 12a and 12b is larger than the inside width of the bottom section 26 by approximately the material thickness of profile 2. The inside width of top section 25 on the sides of legs 17a and 17b is larger than the inside width of the bottom section 26 by approximately the material thickness of profile 2 and the width of sliding pieces 18a. Thus, additional profiles can be inserted into each other in the longitudinal direction.

Within top section 25 of profile 2, bores 14 through legs 12 and 17 are provided for horizontally receiving a retaining bolt 6. A hook 5 for holding the plate-like construction components 1 is swivel-mounted on retaining bolt 6.

The horizontal leg 16b includes an opening 30 for receiving a fastening element 4 (FIG. 3), such as, for example, a wood screw or the like. Profiles 2 are fastened at their top ends on the framework parts 3 (i.e., roof battens) using fasteners 4.

Figure 3:
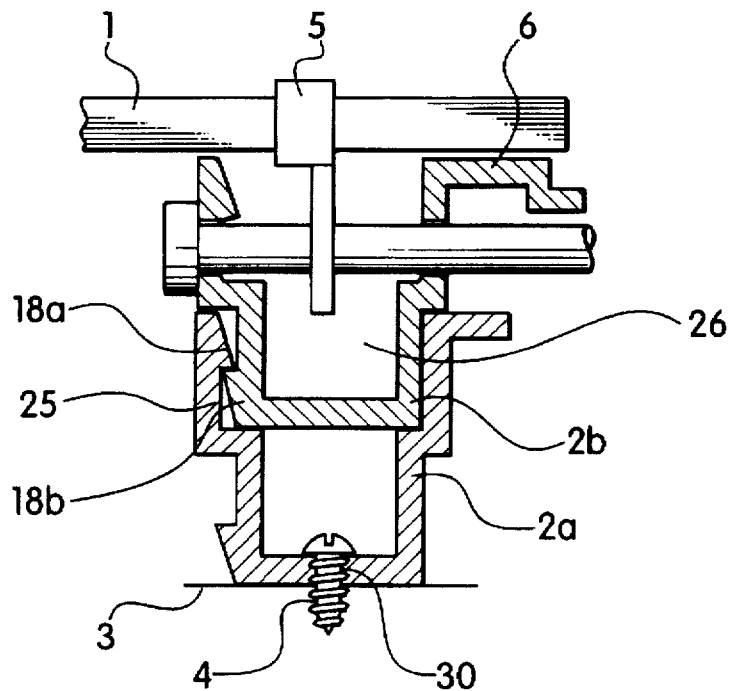
FIG. 3 is a cross-sectional view of the mounting device taken along line III—III of FIG. 1.

FIG. 3 shows a detailed depiction of a second profile 2b inserted in the top end of a first profile 2a. First profile 2a is fastened to framework 3 by fastener 4. Fastener 4 may be shaped and designed differently to conform with the framework or mounting support being used.

FIG. 2 shows that each horizontally arranged plate-like construction component 1 rests with their lateral edge disposed on one of the support surfaces 10 and forms a gap 24 between said surfaces and lateral edges directly above groove 11. Water and penetrating moisture drains downwardly into groove 11. A seal 7 disposed between support surfaces 10 and plate-like construction components 1 provides careful support of said components, such as, as solar module, in addition to preventing moisture from penetrating the profile. Seal 7 is made from neoprene or rubber.

Hook 5 is swivel-mounted on retaining bolt 6. Retaining bolt 6 is made from stainless steel, but may be made of any other suitable known material. Bolt 6 may also be designed as a specialized screw. Hook 5 can be arranged laterally next to profile 2 (FIG. 2), or can be arranged in the top section 25 between inner leg 12 and outer leg 17 (FIG. 3). Since hook 5 is swivel-mounted, during installation, plate-like construction components 1 can be slipped over profile 2 upwardly from the bottom, and hook 5 can then be folded into its retaining position.

Figure 4:
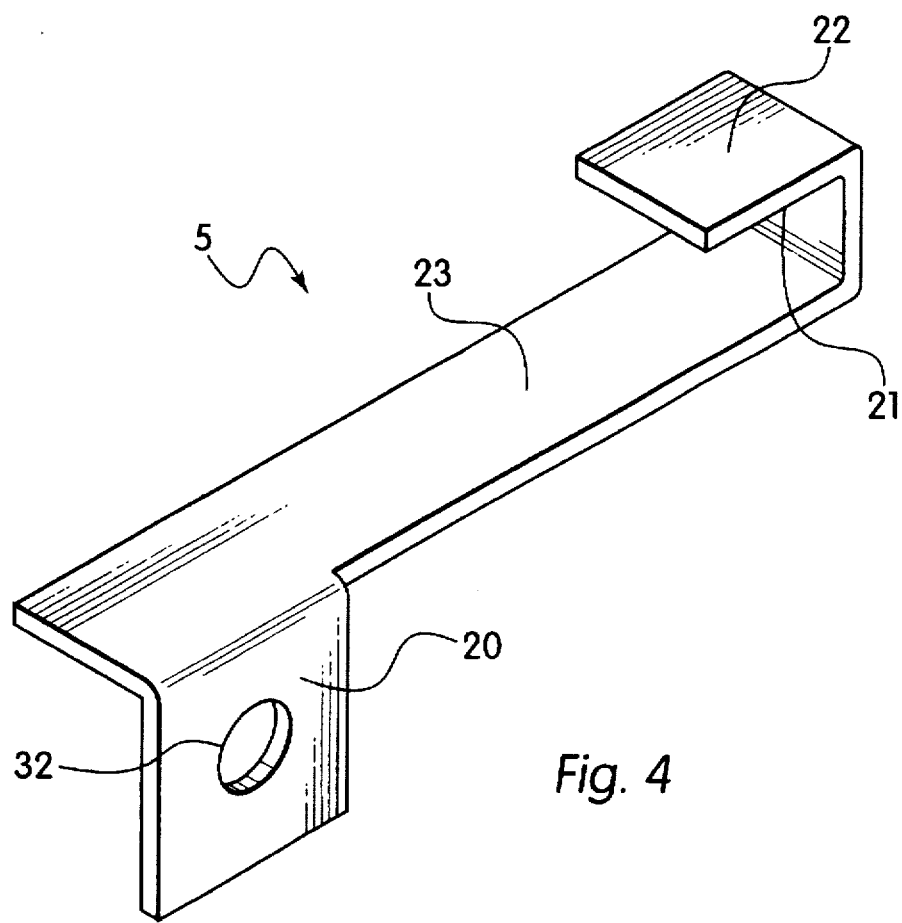
FIG. 4 is a perspective view of the hook for suspending plate-like construction components according to the invention.

Referring to FIG. 4, hook 5 has a leg 20 with which said hook is swivel mounted on the retaining bolt through hole 32. A forwardly extending bridge 23 is laterally arranged on leg 20 at a right angle. The front end of bridge 23 forms the actual receptacle for the plate-like construction component and consists of a first leg 21 bent at substantially a right angle with respect to leg 23, and a second leg 22 bent a right angle with respect to first leg 21. Second leg 22 extends parallel to leg 23. The width between leg 22 and leg 23 corresponds with the thickness of the plate-like construction component 1.

The mounting of construction component 1, as well as the scale-like overlapping of the plate-like construction component in the longitudinal direction are substantially determined by the length of the bridge 23.

FIG. 3 shows how the profiles are mounted to obtain the scale-like configuration. The rearward end of the bottom profile 2a is fastened on the framework 3 with fastening element 4. The front or forward end of a second profile 2b is disposed such that its lower section 26 is inserted into the upper lateral section 25 of lower profile 2a. This design assures a positive joint connection between the profiles. The horizontal surfaces of the sliding pieces 18a and 18b disposed on the outer vertical legs 17 engage and abut each other and thereby prevent any detachment caused by lifting profile 2b disposed on top. The retaining bolt 6 is arranged in the top section 25 of top profile 2b for the foldable support of hook 5. Thus, plate-like construction component 1 can be hooked up over the construction component disposed underneath, thereby obtaining the scale-like configuration.

Profiles 2 can be inserted into one another over any desired length, and therefore can accommodate differences in length.

While one embodiment of the present invention have been shown and described, it is to be understood that many changes and modifications may be made thereunto without departing from the spirit and scope of the invention as defined in the appended claims.

What is claimed is:

1. A device for mounting plate-like construction components on inclined surfaces, the plate-like construction components being longitudinally disposed on the inclined surface in rows with the lateral edges of an upper row overlapping the lateral edges of an adjacent lower row in a scale-like manner, the device comprising:

a plurality of horizontally disposed mounting supports adapted for coupling to the inclined surface;

mounting profiles coupled to said mounting supports for extending longitudinally along the inclined surface, each of said mounting profiles having a material thickness, and an inverted U-shape with a first and second leg member coupled by a bridge member;

each of said first and second leg members having an inner and outer vertical leg coupled by a lower horizontal leg to create an open top chamber, said outer vertical legs laterally limiting said profile and having a top, a bottom, an inside surface and outside surface, each of said inner and outer vertical legs having a horizontal step disposed at the same vertical level, said step dividing said chambers of the first and second leg members into a top and bottom section, whereby the bottom section of a second profile is insertable into a top section of a first profile in an abutting relation; and at least one hook having one end releasably secured to said profile, and a second end for receiving and retaining a lateral edge of the plate-like construction component.

2. The device according to claim 1, wherein said top and bottom sections have substantially equal inside heights, each of said top and bottom sections having a width, said outer vertical legs further comprising:

a first sliding piece disposed at said top of said inside surface, said first sliding piece having a width, a height, a sloped surface and a horizontal surface;

a second sliding piece disposed at said bottom of said outside surface, said second sliding piece having a width equal to said first sliding piece, a height, a sloped surface and a horizontal surface;

said height of said first and second sliding pieces being approximately equal to one half said inside height of said top and bottom sections;

whereby when a second profile is inserted into a first profile, said horizontal surface of said first sliding piece of the first profile rests against said horizontal surface of said second sliding piece of the second profile; and said width of said top section on a side nearest said inner leg being greater than the width of said bottom section by approximately the material thickness of said profile, and said width of said top section on a side nearest said outer vertical leg being greater than the width of said bottom section by approximately the material thickness of said profile and the width of said first sliding piece.

3. The device according to claim 1, wherein said bridge member of said inverted U-shaped profile further comprises:

two lateral support surfaces extending longitudinally along said profile;

a groove disposed in said bridge member between said support surfaces; and whereby the lateral edges of each plate-like construction component can rest on one of said support surfaces such that a gap remains between the lateral edges and is disposed directly above said groove.

4. The device according to claim 3, further comprising a seal adapted for placement between said lateral support surfaces and the plate-like construction component.

5. The device according to claim 1, further comprising:

a bore through each of said first and second leg members, each of said bores being disposed at an equal height with respect to each other in said top sections of said leg members; and a retaining bolt extending through said bores and thereby through said profile, said hook being swivel-mounted on said retaining bolt.

6. The device according to claim 5, wherein said hook is disposed laterally with respect to said profile on said retaining bolt adjacent said outside surface of said outer vertical leg.

7. The device according to claim 5, wherein said hook is disposed on said retaining bolt within said top section of the profile.

8. The device according to claim 1, further comprising an opening in said lower horizontal leg, and fastener fitting through said opening for fastening said profile to said mounting supports.

9. The device according to claim 8, wherein when a second profile is inserted into a first profile, said opening is disposed in an upper most leg member of said first profile with respect to the inclined surface.

* * * * *